INVENTOR.
HERMAN L. BROWN
BY Norman N. Popper
ATTORNEY

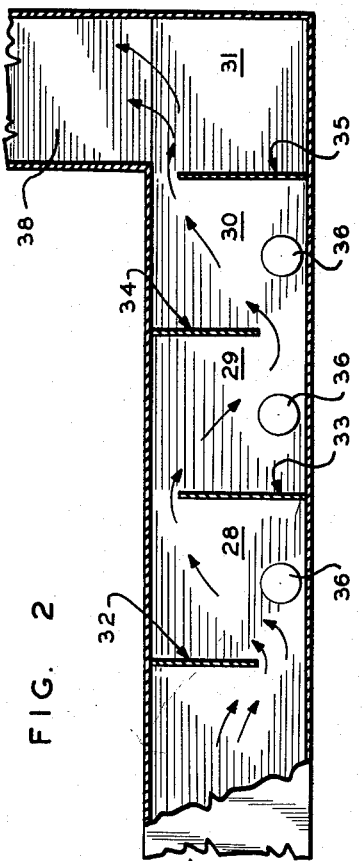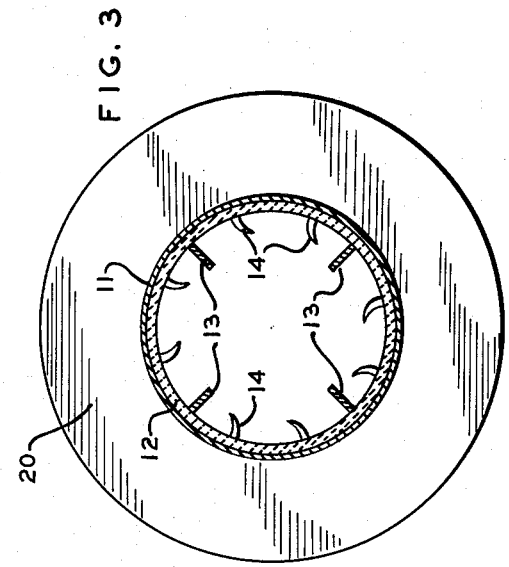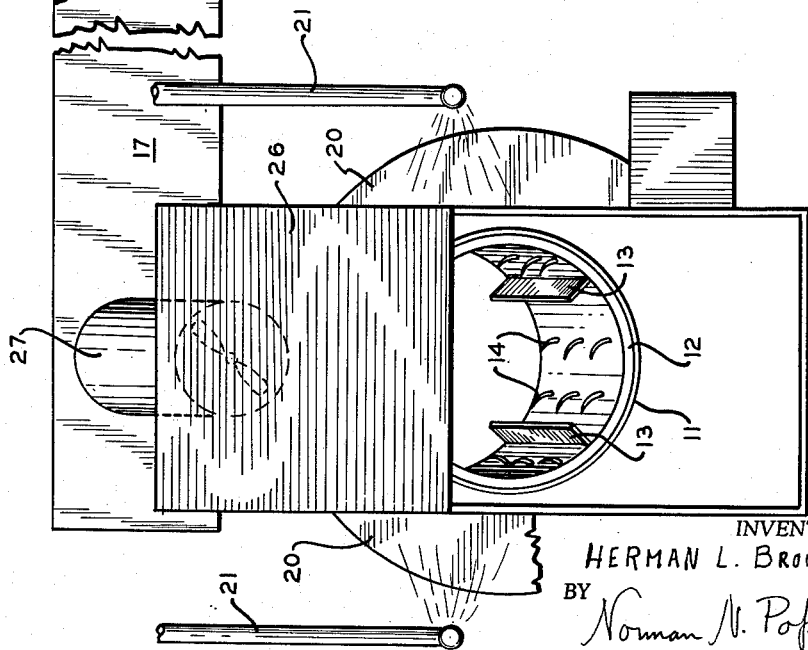

United States Patent Office 3,116,545
Patented Jan. 7, 1964

3,116,545
RECOVERING PURE METAL FROM INSULATED SCRAP WIRE
Herman L. Brown, 100 Ocean Parkway, Brooklyn, N.Y.
Filed July 3, 1962, Ser. No. 207,281
5 Claims. (Cl. 29—403)

The invention relates generally to removing insulation from scrap wire, and particularly to recovering relatively high percentages of pure metal from insulated scrap wire by burning off the insulation.

It is an object of the invention to remove insulation from wire without oxidizing a substantial portion of the metal.

It is another object of the invention to burn insulation from scrap wire, while keeping the wire at a temperature below that at which metallic oxides are formed.

It is yet another object of the invention to produce pure metal wire scrap relatively free of oxide encrustations, as well as to avoid the production of ash with a high metallic oxide content.

Among the further objects of the invention is to produce insulation stripped wire, and avoid the production of offensive discharges into the atmosphere, of the combustion products of insulation.

These objects and advantages as well as other objects and advantages may be attained from the apparatus illustrated in the drawings in which:

FIGURE 2 is a front elevational view thereof; and

FIGURE 3 is a vertical sectional view of the tube furnace taken on the line 3—3 in FIGURE 1.

Figure 1:
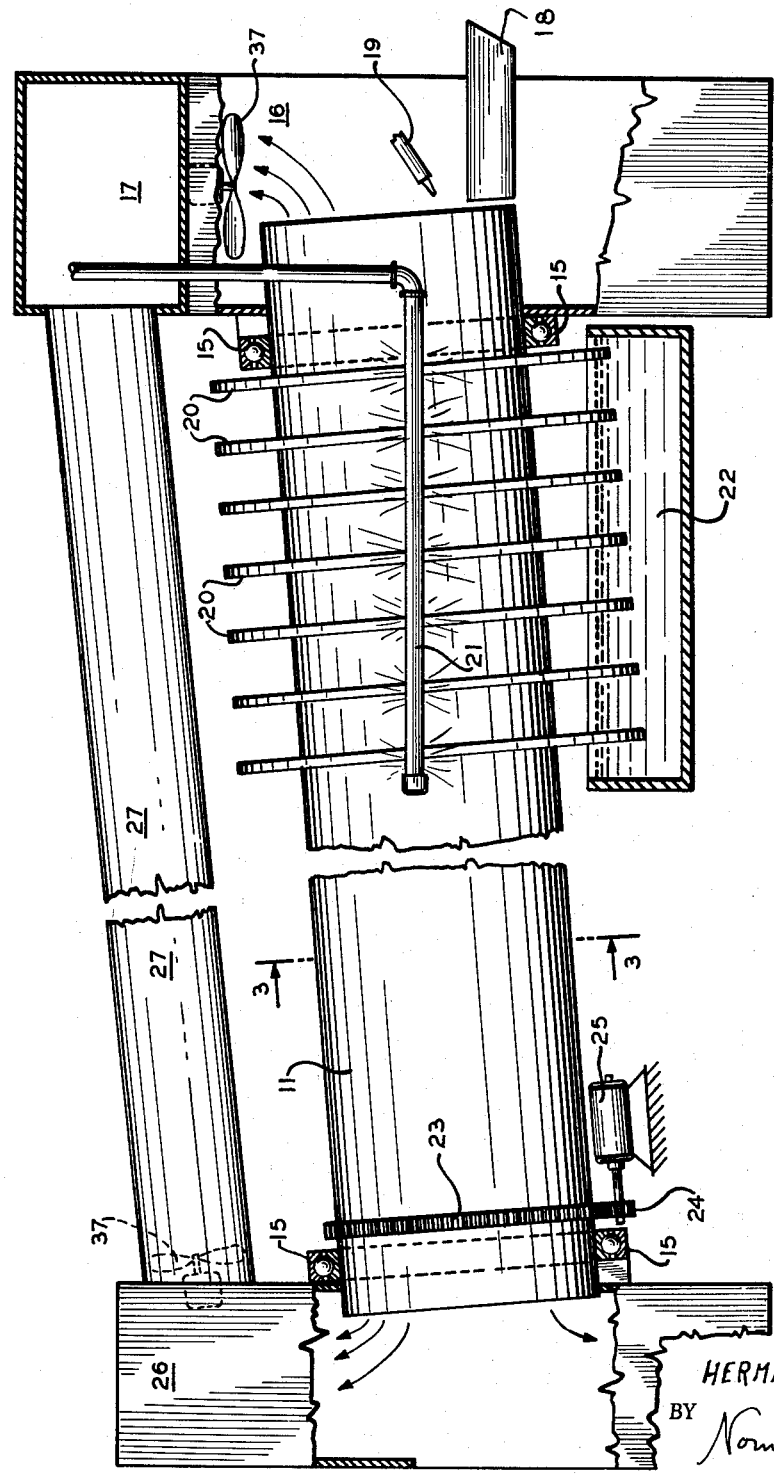
FIGURE 1 is a partial side elevation of the apparatus for recovering pure metal from insulated scrap wire.

The method of recovering relatively high percentages of pure metal from insulated scrap wire consists generally of burning the insulation off the wire in a relatively cool tube furnace while constantly agitating the wire, whereby the wire is maintained at a temperature sufficiently low so that there is relatively little oxidation of the metal, yet the insulation is completely burned off. The apparatus in which this is accomplished is a rotary tube or kiln, in which the insulation burns. The combustion of the insulation is not impaired by the agitation, and in fact is actually encouraged by virtue of the more free access of the atmosphere to the combustion; the burning of the insulation takes place more rapidly, the agitation keeps the wire at a relatively lower temperature than in the conventional open burning without agitation. The metallic oxide wastes are drastically reduced in quantity, the percentage of metal recovered is high, and the fact that the metal is kept at a lower temperature is confirmed by the fact that the metal recovered suffers no substantial loss in ductility.

Referring now to the drawings in detail, the insulation burner illustrative of the invention comprises a tube furnace 11 approximately twenty-five to thirty feet in length. The diameter of the tube may be approximately four feet. The tube 11 may be lined with refractory brick 12 to protect the wall, which is preferably made of metal. The tube 11 is provided, in its first third of length with a series of radial fins 13, and hooks 14, which agitate the wire and insure that the heat of combustion will be disseminated, and that there will be as little heat build up of the wire as possible as the insulation burns off.

The tube is mounted for rotation on bearings 15. It is set at an angle of approximately 15°, descending from its receiving end, so that the contents gravitationally traverse the tube. The receiving end of the tube is encased in a hood 16. The hood is connected to a horizontal flue 17, which receives and carries off the offensive products of combustion. In the hood, there is mounted an arcuate loading tray 18, into which the scrap insulated wire is deposited, and pushed into the kiln. A gas burner jet 19 is located in the hood 16, for directing a jet of flame into the tube 11, to start the combustion of the insulation on the scrap. Once it has started, the jet is extinguished and combustion continues as scrap is continuously added. Combustion may also be started by adding a quantity of oil soaked fabric or sawdust. The gas flame or the oil soaked sawdust is only necessary at the start to commence the combustion.

The tube 11 is provided with a number of external radial fins 20 to help dissipate the heat of combustion. These fins may be confined to the first third of the outer surface of the tube 11. In addition to the cooling provided by the fins 20, a spray tube 21 is aligned with the side of the tube 11 so that cool water may be applied to the outside of the tube 11. A water trough 22 is also positioned beneath the tube 11 so that the fins 20 may continuously be wetted and cool the tube 11 by evaporation as well as by heat transfer with the water in the trough 22. The lower end of the tube 11 is provided with an external ring gear 23, which engages a smaller gear 24 on the motor shaft 25.

The lower end of the tube 11 is also covered by a hood 26. As the tube 11 gravitationally discharges its solid contents, the gaseous content not escaping at the intake end, are picked up at the discharge hood 26 and carried through the duct 27 to the horizontal flue 17.

The horizontal flue 17 is divided into a series of compartments 28, 29, 30, 31 by a series of perforated baffles 32, 34, 35. These baffles are parallel with each other and are provided with perforation which are not in alignment but are offset and staggered from each other so that the products of combustion may not proceed in a straight line through the compartments, and a maximum degree of turbulence of the combustion products will be set up in each compartment. There are oil burners 36 located in each compartment. Since the original combustion is maintained at a low temperature level, it tends to be incomplete. The burners in the compartments 28, 29, 30 tend to complete the combustion of the products of the burned insulation. Thus, the vertical stack receives completely burned materials which tend to be much less offensive than those derived from the conventional insulation burning operation. Blowers 37 in the duct 27 and hood 16 encourage the evacuation of combustion products.

The rate at which scrap insulated wire travels through the tube is dependent upon the material of the insulation, the thickness of the insulation, the angle at which the tube is set, and the rate of rotation. The rate may be determined with ease upon trial, by inspecting the product to determine the completeness with which the insulation has been burned off and the fact that the wire product appears quite as ductile as when it was introduced and there is relatively no (or slight) evidence of oxidation.

Generally, it will be found that the preferred rate of rotation of the tube 11 is about ten revolutions per minute, although it has been found that with high melting point metal wires, the rate of rotation may be slowed to two r.p.m. Faster rotation produces quicker travel of the wire. It has been found that insulation burning in a tube furnace takes about five minutes. In the normal stationary burning method, it takes about fifteen minutes until the insulation is consumed.

With low melting point metal wires, the traversal may be speeded to five minutes through the tube 11 to prevent the wire from reaching too high a temperature. The water bath helps in this respect. High melting point wires usually do not require the extra cooling of the water spray, and they may be moved through the tube at a much lower rate.

In the conventional wire stripping by burning, the metal recovery may be 50% by weight of the original material introduced, the remainder being insulation ash and oxides. In the rotary kiln or tube method where oxidation of metal may be carefully controlled, the metal recovery may be 65% or higher, the remainder being nearly a full 35% of insulation ash with only small percentages of metal oxides. The conventional open burning of insulation thus results in a 15% loss of metal by production of metallic oxides, while the rotary kiln method reduces metallic oxide formation to less than one percent if proper control of temperature of the metal is maintained.

The method of recovering relatively high percentages of metal from insulated wire proceeds in this manner:

(1) The tube furnace lined with refractory brick is continuously rotated;

(2) the tube is mounted at an angle of approximately 15° above horizontal so that the wire scrap will gravitationally traverse the tube;

(3) insulated wire is fed into the tube;

(4) flanges and hooks in the tube agitate the wire;

(5) combustion of the insulation is started;

(6) the products of combustion are drawn off into a flue and thoroughly burned in an afterburner before being discharged through a high stack;

(7) the burning insulation is constantly agitated by tumbling the wire, and the wire is cooled by convection of air through the tube, by an exterior water spray, by heat exchange fins on the tube, and by the fins dipping into and picking up water from a trough under the tube;

(9) the wire is further cooled by agitation and air convection during its traversal of the last two thirds of the tube, since combuston is usually completed in the first one third of the tube;

(10) the wire recovered is still ductile, relatively free from heavy oxide coating or encrustation, free of insulation, and the ash is almost 100% insulation ash, with low metal oxide debris.

The foregoing method is merely illustrative of the steps constituting the invention, since many changes may be made therein without departing from the spirit of the invention.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. Process of recovering high percentages of relatively pure metal from scrap insulated wire comprising,
   (a) rotating a tilted tube furnace,
   (b) depositing scrap insulated wire in the upper end of the furnace,
   (c) igniting and burning the insulation on the scrap wire,
   (d) cooling the metal of the scrap wire as the insulation burns, by tumbling the wire progressively around in and down through the furnace from the upper to the lower end.

2. Process of recovering high percentages of relatively pure metal from scrap insulated wire comprising,
   (a) the process of claim 1, and
   (b) discharging the combustion products from the tube furnace into an after-burner section,
   (c) burning the combustion products in the afterburner section,
   (d) conducting the burned combustion products into a stack,
   (e) discharging the burned combustion products into the atmosphere.

3. Process of recovering high percentages of relatively pure metal from scrap insulated wire comprising,
   (a) the process of claim 1, and
   (b) cooling the outside of the tube furnace.

4. Process of recovering high percentages of relatively pure metal from scrap insulated wire comprising,
   (a) the process of claim 1, and
   (b) providing a plurailty of heat radiating fins on the outside of the furnace.

5. Process of recovering high percentages of relatively pure metal from scrap insulted wire comprising,
   (a) the process of claim 1, and
   (b) spraying water on the outside of the furnace as it rotates.

References Cited in the file of this patent

UNITED STATES PATENTS

| | | |
|---|---|---|
| 1,728,597 | Dumas | Sept. 17, 1929 |
| 1,750,813 | Oakley et al. | Mar. 18, 1930 |
| 2,747,265 | Boessenkool | May 29, 1956 |
| 2,782,494 | Gordon | Feb. 26, 1957 |